(12) United States Patent
Sakamoto et al.

(10) Patent No.: US 10,292,194 B2
(45) Date of Patent: May 14, 2019

(54) VOICE INPUT/OUTPUT APPARATUS, WIRELESS CONNECTION METHOD, AND VOICE INTERACTION SYSTEM

(71) Applicant: TOYOTA JIDOSHA KABUSHIKI KAISHA, Toyota-shi, Aichi-ken (JP)

(72) Inventors: Hayato Sakamoto, Kawasaki (JP); Atsushi Ikeno, Kyoto (JP); Hiroshi Yamaguchi, Azumino (JP); Yuta Yamamoto, Azumino (JP); Toshifumi Nishijima, Kasugai (JP); Satoru Sasaki, Gotemba (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/957,707

(22) Filed: Apr. 19, 2018

(65) Prior Publication Data

US 2018/0317270 A1 Nov. 1, 2018

(30) Foreign Application Priority Data

Apr. 27, 2017 (JP) ................................ 2017-088784

(51) Int. Cl.
*H04W 76/14* (2018.01)
*G10L 15/22* (2006.01)
(Continued)

(52) U.S. Cl.
CPC ............ *H04W 76/14* (2018.02); *G06F 3/167* (2013.01); *G10L 15/22* (2013.01); *H04W 4/80* (2018.02); *G10L 2015/223* (2013.01)

(58) Field of Classification Search
CPC combination set(s) only.
See application file for complete search history.

(56) References Cited

U.S. PATENT DOCUMENTS

2005/0070338 A1* 3/2005 Nagahama .......... H04M 1/6066
455/569.1
2007/0183325 A1 8/2007 Tamura
(Continued)

FOREIGN PATENT DOCUMENTS

JP 2007-214804 A 8/2007
JP 2012-038102 A 2/2012
(Continued)

*Primary Examiner* — Junpeng Chen
(74) *Attorney, Agent, or Firm* — Oliff PLC (57) ABSTRACT

A voice I/O apparatus comprises a voice input unit that acquires uttered voice; a connection control unit that controls connection between the voice I/O apparatus and a control apparatus that generates a response to the voice; and an interaction control unit that transmits the acquired voice to the control apparatus, receives the response to the voice, and outputs the response, wherein the connection control unit establishes, between the voice I/O apparatus and the control apparatus, connection of a voice channel over which the voice is transmitted and connection of a data channel over which data other than the voice is transmitted, and terminates the data channel in a case where the connection of the voice channel is not completed within a given time period from the establishment of the connection of the data channel.

11 Claims, 6 Drawing Sheets

(51) Int. Cl.
*H04W 4/80* (2018.01)
*G06F 3/16* (2006.01)

(56) References Cited

U.S. PATENT DOCUMENTS

| | | | |
|---|---|---|---|
| 2009/0215491 A1* | 8/2009 | Hou | G06K 19/0701 455/558 |
| 2016/0007189 A1 | 1/2016 | Miura | |
| 2017/0134950 A1* | 5/2017 | Goldman | H04M 1/6041 |

FOREIGN PATENT DOCUMENTS

| | | |
|---|---|---|
| JP | 2014-160910 A | 9/2014 |
| JP | 2014-192791 A | 10/2014 |
| JP | 2015-013351 A | 1/2015 |
| JP | 2015-177511 A | 10/2015 |
| WO | 2015/068726 A1 | 5/2015 |

\* cited by examiner

VOICE INPUT/OUTPUT APPARATUS, WIRELESS CONNECTION METHOD, AND VOICE INTERACTION SYSTEM

CROSS REFERENCE TO RELATED APPLICATION

This application claims the benefit of Japanese Patent Application No. 2017-088784, filed on Apr. 27, 2017, which is hereby incorporated by reference herein in its entirety.

BACKGROUND OF THE INVENTION

Field of the Invention

The present invention relates to an apparatus that interacts with a person by voice.

Description of the Related Art

In recent years, a robot for providing various pieces of information by interacting with a person is developed. For example, Japanese Patent Application Publication No. 2015-013351 discloses a communication robot that processes, on a network, a voice input with a microphone and responds to the input by voice.

In a system described in Japanese Patent Application Publication No. 2015-013351, an interaction server generates a voice and, at the same time, determines the motion of a robot, and transmits the voice and data representing the motion of the robot (motion data) to the robot. With this, it is possible to cause the robot to move a movable portion such as a joint to perform an action.

SUMMARY OF THE INVENTION

In the field of the communication robot, in order to reduce cost, it is common to adopt a configuration in which a robot serving as an interface performs wireless communication with a control apparatus (a portable computer such as, e.g., a smart phone), and voice recognition and response generation are performed on the side of the control apparatus. In a connection between the robot and the control apparatus, a short-range wireless communication standard such as Bluetooth (registered trademark) is often used.

On the other hand, in the case where a general-purpose wireless connection standard is used for the connection between the robot and the control apparatus, a problem arises in that unrelated equipment that uses the standard attempts to connect to the robot.

The present invention has been made in consideration of the above problem, and an object thereof is to prevent unnecessary connection in a voice interaction system in which a robot and a control apparatus are wirelessly connected to each other.

The present invention in its one aspect provides a voice input/output apparatus used for voice interaction with a user, comprising a voice input unit configured to acquire a voice uttered by the user; a connection control unit configured to control connection between the voice input/output apparatus and a control apparatus that generates a response to the voice; and an interaction control unit configured to transmit the acquired voice to the control apparatus, receive the response to the voice from the control apparatus, and output the response to the voice, wherein the connection control unit establishes, between the voice input/output apparatus and the control apparatus, connection of a voice channel over which the voice is transmitted and connection of a data channel over which data other than the voice is transmitted, and terminates the data channel in a case where the connection of the voice channel is not completed within a predetermined time period from the establishment of the connection of the data channel.

The voice input/output apparatus according to the present invention is an interface apparatus that has a voice input/output function, and performs the interaction with the user by communicating with the control apparatus. The voice input/output apparatus according to the present invention transmits the acquired voice to the control apparatus, acquires the response to the voice (e.g., voice data serving as the response) from the control apparatus, and outputs the response.

The connection control unit establishes the connection between the voice input/output apparatus and the control apparatus by the two channels which are the voice channel over which the voice is transmitted and the data channel over which data other than the voice is transmitted. The voice channel is the channel specializing in the transmission of the voice, and the data channel is the channel specializing in the transmission of data other than the voice. The data other than the voice is, e.g., data for controlling the voice input/output apparatus. For example, in the case where the voice input/output apparatus is a robot having a movable portion, a command for causing the movable portion to move is transmitted over the data channel.

In addition, in the case where the connection of the voice channel is not completed within the predetermined time period from the establishment of the connection of the data channel, the connection control unit determines that the control apparatus is not a proper communication partner, and terminates the data channel. That is, unless the control apparatus to which the voice input/output apparatus is to be connected performs a proper procedure in which the data channel and the voice channel are connected simultaneously, the connection is not allowed.

According to the configuration described above, in the case where the connection from an unrelated apparatus that uses the same wireless communication standard is performed, it is possible to eliminate the unnecessary connection.

Further, each of the voice channel and the data channel may be connected based on a Bluetooth standard, and the voice channel may be connected by using a voice profile.

The voice input/output apparatus and the control apparatus perform short-range communication in a state in which they are paired with each other, and hence the connection based on Bluetooth is suitable. In addition, the advantage is achieved that it is possible to use a smart phone or the like as the control apparatus, and reduce power consumption. Further, by using the voice profile, utterance with little delay is allowed.

Further, the data channel may be connected based on a Bluetooth Low Energy (BLE) standard.

By using BLE as the channel for data communication, it is possible to reduce power consumption, and increase the continuous operation time of the apparatus.

Further, the connection of the voice channel may involve two types of connection including the connection based on the voice profile and audio connection established via the voice profile, and the connection control unit may accept the audio connection from the control apparatus after completion of both of the connection based on the voice profile and the connection based on the BLE, and may terminate the connection based on the BLE in a case where the audio connection is not completed within a predetermined time period from the establishment of the connection based on the BLE.

When equipment that is connected in advance based on the voice profile is present, there are cases where the audio connection is automatically performed at a timing unrelated to the connection based on BLE.

To cope with this, in order to cause the timing to coincide with the connection based on BLE, the audio connection is awaited after the connection based on BLE is established. With this, it becomes possible for the same equipment to be provided with the data channel and the voice channel reliably.

Further, the voice profile may be Hands-Free Profile (HFP).

Hands-Free profile (HFP) is a profile for making or receiving a call and performing a telephone conversation that is used for communication between mobile phones and headsets. By using the profile, bidirectional voice transmission is allowed.

The present invention in its another aspect provides a wireless connection method performed on a control apparatus by a voice input/output apparatus that acquires a voice uttered by a user and outputs, by voice, a response to the voice that is generated by the control apparatus, the wireless connection method comprising establishing, between the voice input/output apparatus and the control apparatus, connection of a voice channel over which the voice is transmitted and connection of a data channel over which data other than the voice is transmitted in a case where a request is issued from the control apparatus; and terminating the data channel in a case where the connection of the voice channel is not completed within a predetermined time period from the establishment of the connection of the data channel.

The present invention in its another aspect provides a voice interaction system comprising an audio interface apparatus; and a control apparatus, wherein the audio interface apparatus includes a first control unit configured to acquire a voice uttered by a user, transmit the voice to the control apparatus, receive a response to the voice from the control apparatus, and output the response to the voice, the control apparatus includes a second control unit configured to generate the response based on the voice received from the audio interface apparatus, and transmit the response to the audio interface apparatus, the audio interface apparatus and the control apparatus are connected to each other by a voice channel over which the voice is transmitted and a data channel over which data other than the voice is transmitted, and the audio interface apparatus terminates the data channel in a case where the connection of the voice channel is not completed within a predetermined time period from the establishment of the connection of the data channel.

Note that the present invention can be viewed as a voice input/output apparatus or a voice interaction system that includes at least part of the above units. In addition, the present invention can also be viewed as a wireless connection method performed by the voice input/output apparatus or a voice interaction method performed by the voice interaction system. The above processes and units can be arbitrarily combined and implemented as long as no technical conflicts occur.

According to the present invention, it is possible to prevent the unnecessary connection in the voice interaction system in which the robot and the control apparatus are wirelessly connected to each other.

DESCRIPTION OF THE EMBODIMENTS

Hereinbelow, a preferred embodiment of the present invention will be described with reference to the drawings.

A voice interaction system according to the present embodiment is a system in which interaction with a user is performed by acquiring a voice uttered by the user and performing voice recognition, and generating a response sentence based on the result of the recognition.

(System Configuration)

Figure 1:
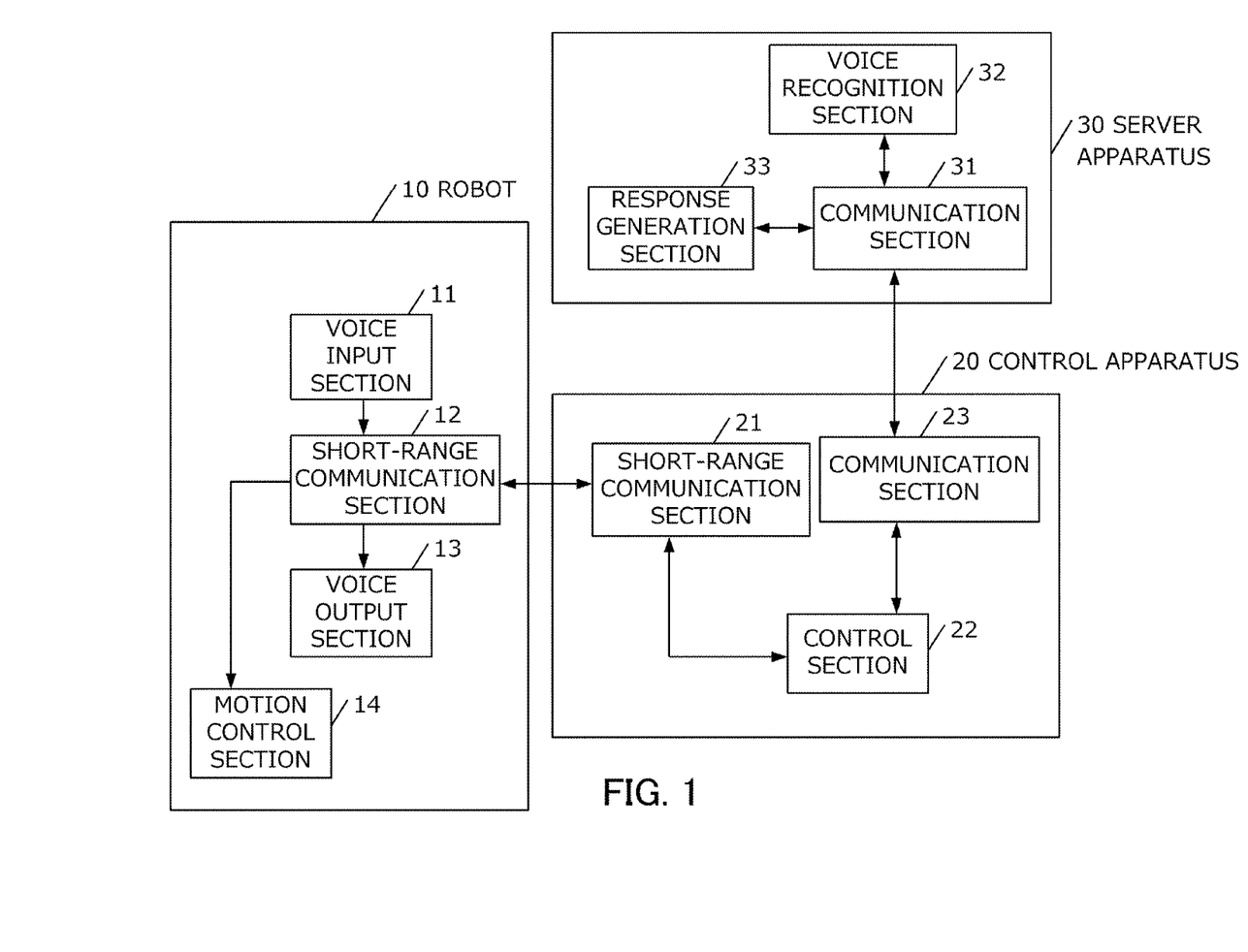
FIG. 1 is a system configuration diagram of a voice interaction system according to an embodiment.

FIG. 1 is a system configuration diagram of the voice interaction system according to the embodiment. The voice interaction system according to the present embodiment includes a robot 10, a control apparatus 20, and a server apparatus 30.

The robot 10 has a speaker, a microphone, a camera and the like, and is a unit configured to serve as an interface with the user. The robot 10 may be a humanoid robot or a character-type robot, or may have other shapes.

The control apparatus 20 is an apparatus that performs the interaction with the user by using the robot 10. The server apparatus 30 is an apparatus that generates a response (response sentence) provided to the user in accordance with a request transmitted from the control apparatus 20.

In the present embodiment, the robot 10 functions only as a user interface, and processes for controlling the entire system such as recognition of an utterance content, generation of the response sentence, and other processes are performed by the control apparatus 20 and the server apparatus 30.

The robot 10 will be described first.

The robot 10 includes a voice input section 11, a short-range communication section 12, a voice output section 13, and a motion control section 14.

The voice input section 11 is a unit configured to acquire a voice uttered by the user. Specifically, the voice input section 11 converts the voice to an electrical signal (hereinafter referred to as voice data) by using an incorporated microphone. The acquired voice data is transmitted to the control apparatus 20 via the short-range communication section 12 described later.

The short-range communication section 12 is a unit configured to perform short-range wireless communication with the control apparatus 20. In the present embodiment, the short-range communication section 12 performs the communication by using a Bluetooth (registered trademark) standard. The short-range communication section 12 stores information related to the control apparatus 20 with which the short-range communication section 12 is to be paired, and can perform connection by a simple process. Note that the Bluetooth standard is also referred to as IEEE802.15.1.

The voice output section 13 is a unit configured to output the voice provided to the user. Specifically, the voice output section 13 converts the voice data transmitted from the control apparatus 20 to the voice by using an integrated speaker.

The motion control section 14 is a unit configured to control the motion of the robot 10 by driving actuators incorporated in a plurality of movable portions of the robot 10. Specifically, the motion control section 14 causes the robot 10 to perform predetermined actions by driving the actuators disposed in joints of, e.g., a hand, a shoulder, an elbow, and a leg based on a command transmitted from the control apparatus 20.

In addition, the motion control section 14 stores the operation definition of the actuator (defines the actuator corresponding to each command and the operation of each actuator), and drives the actuator based on the command transmitted from the control apparatus 20.

Figure 2:
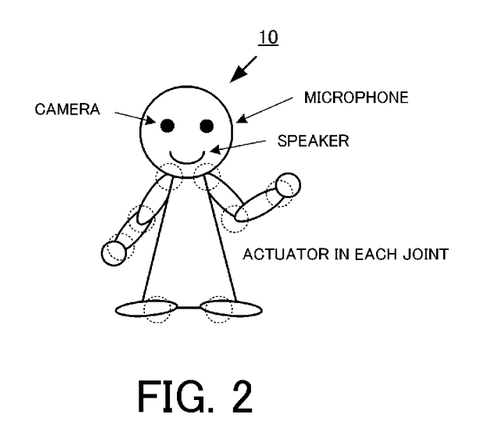
FIG. 2 is a view for explaining a robot 10.

Note that the movable portion may be provided in each joint as shown in, e.g., FIG. 2, and may also be provided in a part other than the joint such as a wheel.

In addition, the action performed by the robot 10 may be the action that uses a portion other than the movable portion. For example, the action may be performed by using blinking of light.

Next, the control apparatus 20 will be described. The control apparatus 20 is an apparatus that performs control of the robot 10, and is typically a small computer such as a mobile computer, a mobile phone, or a smart phone. The control apparatus 20 can be configured as an information processing apparatus having a CPU, a main storage apparatus, and an auxiliary storage apparatus. A program stored in the auxiliary storage apparatus is loaded into the main storage apparatus and the program is executed by the CPU, and the individual units shown in FIG. 1 thereby function. Note that all or part of the functions shown in the drawing may be executed by using an exclusively designed circuit.

The control apparatus 20 includes a short-range communication section 21, a control section 22, and a communication section 23.

The functions of the short-range communication section 21 are the same as those of the short-range communication section 12 described above, and hence the detailed description thereof will be omitted.

The control section 22 is a unit configured to acquire a voice from the robot 10 and acquire a response to the acquired voice. Specifically, the control section 22 transmits the voice acquired from the robot 10 to the server apparatus 30 via the communication section 23 (they will be described later), and receives the corresponding response sentence from the server apparatus 30. In addition, the control section 22 converts the response sentence to the voice data by a voice synthesis function, and transmits the voice data to the robot 10. The voice transmitted to the robot 10 is provided to the user via the voice output section 13. With this, the user can perform interaction based on natural language.

In addition, the control section 22 generates a drive command of the robot based on the acquired response sentence, and transmits the drive command to the robot 10. With this, it becomes possible for the robot to perform the reaction in accordance with the utterance. The generation of the drive command can be performed based on, e.g., the result of classification of the response sentence. For example, when the server apparatus 30 generates the response sentence, data representing the type of the response may be added, and the drive command may be generated based on the type. The type of the response may also be acquired by analyzation of the response sentence by the control section 22.

The type of the response may be provided for each simulated feeling such as delight, anger, sorrow, or pleasure, and may also be classified according to the scene of conversation and the type of the utterance such as "encounter", "farewell", "answer", "sympathy", and "question". The drive command corresponding to the type of the response is pre-stored in the control section 22.

The communication section 23 is a unit configured to communicate with the server apparatus 30 by accessing a network via a communications network (e.g., a wireless LAN or a mobile telephone network).

The server apparatus 30 is an apparatus that recognizes the transmitted voice and then generates the response sentence provided to the user, and includes a communication section 31, a voice recognition section 32, and a response generation section 33.

The functions of the communication section 31 are the same as those of the communication section 23 described above, and hence the detailed description thereof will be omitted.

The voice recognition section 32 is a unit configured to perform voice recognition on the voice acquired by the voice input section 11 of the robot, and convert the voice to text. The voice recognition can be performed by known techniques. For example, an acoustic model and a recognition dictionary are stored in the voice recognition section 32, and the voice recognition section 32 compares the acquired voice data with the acoustic model to extract a feature, and performs the voice recognition by matching the extracted feature with the recognition dictionary. The result of the recognition is transmitted to the response generation section 33.

The response generation section 33 is a unit configured to generate the response sentence provided to the user based on the text acquired from the voice recognition section 32. The response sentence to be provided may be the response sentence based on, e.g., a pre-stored interaction scenario (interaction dictionary), or may also be the response sentence based on information obtained by searching a database or the web. The details of the process will be described later.

Information acquired by the response generation section 33 is transmitted in text form to the control apparatus 20 and thereafter, the information is converted to a synthesized voice, and the synthesized voice is output toward the user via the robot 10.

The server apparatus 30 can also be configured as an information processing apparatus having a CPU, a main storage apparatus, and an auxiliary storage apparatus. A program stored in the auxiliary storage apparatus is loaded into the main storage apparatus and the program is executed by the CPU, and the individual units shown in FIG. 1 thereby function. Note that all or part of the functions shown in the drawing may be executed by using an exclusively designed circuit.

(Communication between Robot and Control Apparatus)

Next, a description will be given of a transmission/reception method of information between the robot 10 and the control apparatus 20.

Between the robot 10 and the control apparatus 20, three types of pieces of data of (1) the voice data transmitted to the control apparatus from the robot, (2) the voice data transmitted to the robot from the control apparatus, and (3) the drive command transmitted to the robot from the control apparatus are transmitted and received.

In the present embodiment, two connections by Bluetooth connection are established between the robot 10 and the control apparatus 20, and the voice and the drive command are transmitted simultaneously.

Figure 3:
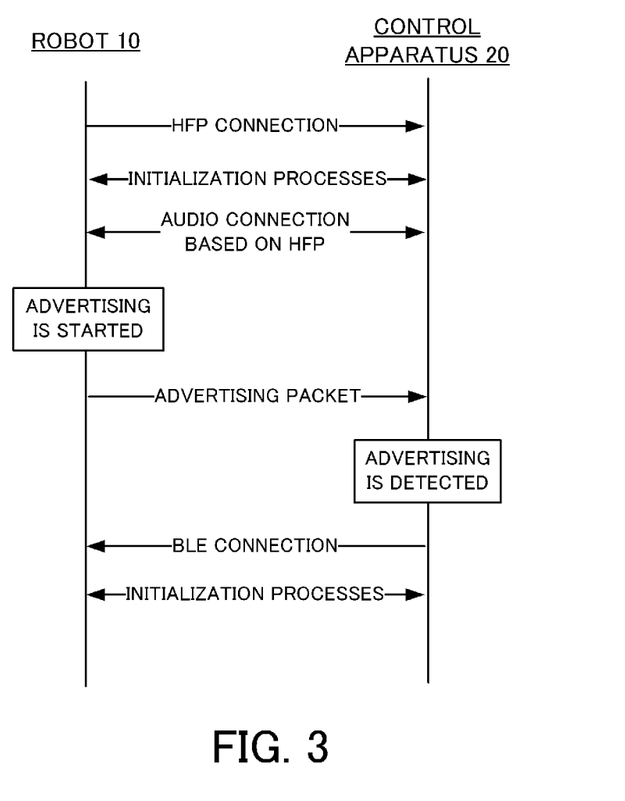
FIG. 3 is a diagram for explaining a connection between the robot 10 and a control apparatus 20.

FIG. 3 is an example of a connection sequence of the robot 10 and the control apparatus 20. Note that, in the present example, it is assumed that the robot 10 has information on the control apparatus 20 to which the robot 10 is to be connected. That is, it is assumed that pairing is completed.

In the case where the connection between the robot 10 and the control apparatus 20 is not established, the robot 10 periodically (e.g., at intervals of 1 second) searches for the control apparatus 20 and, when the robot 10 finds the control apparatus 20, the robot 10 starts connection based on Hands-Free Profile (HFP). HFP is a profile specializing in voice transmission, and bidirectional voice transmission is allowed by using this. Note that, in the present embodiment, the robot 10 corresponds to a hands-free unit in HFP, and the control apparatus 20 corresponds to an audio gateway.

When a connection request is accepted by the control apparatus 20, various initialization processes are executed. Herein, setting of a noise reduction function (NREC), setting of speaker volume (VGS), and setting of microphone gain (VGM) are performed. Note that it takes a little time to complete the initialization processes based on HFP, and hence the robot 10 and the control apparatus 20 may perform other processes in parallel. When the connection based on HFP is completed, audio connection for providing a channel over which the voice is actually transmitted is performed. With this, a voice channel between the robot 10 and the control apparatus 20 is opened.

Next, a process for providing a data channel based on Bluetooth Low Energy (BLE) is performed. BLE is characterized in that a device for providing a service performs a process for notifying surrounding devices of its presence (advertising), and a device having detected the advertising performs connection.

In the present embodiment, after the connection based on HFP is completed, the robot 10 starts an advertising operation (transmission of an advertising packet). The control apparatus 20 starts a scanning operation for performing BLE connection.

When the control apparatus 20 detects the advertising packet transmitted from the robot 10, the control apparatus 20 issues a connection request.

In the case where both of the voice channel and the data channel are provided, it is possible to use a method in which, in the manner described above, the connection based on HFP is performed first, and the process for the connection based on BLE is started at the timing of completion of the connection based on HFP. With this, it becomes possible to automatically establish two connections of the voice channel and the data channel.

Herein, a problem arises in that another apparatus (an apparatus other than the control apparatus 20) having detected the advertising packet transmitted from the robot 10 may issue the connection request to the robot 10.

Figure 4:
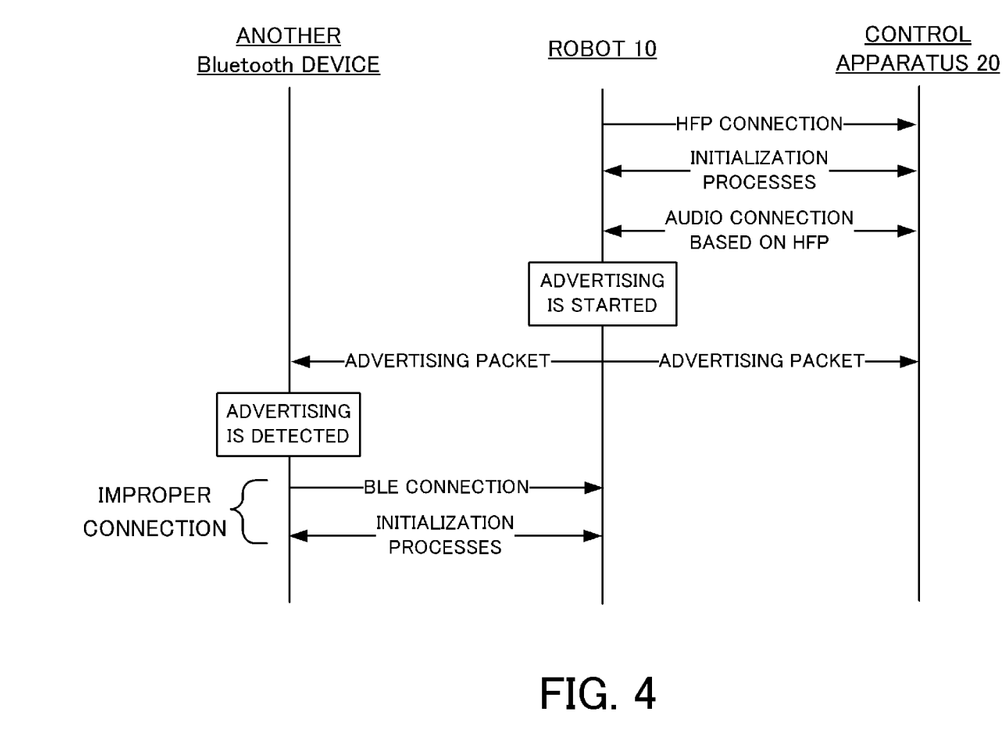
FIG. 4 is a diagram for explaining improper connection to the control apparatus 20.

For example, as shown in FIG. 4, there are cases where another device other than the control apparatus 20 detects the advertising packet and attempts to perform the connection. In such cases, the robot 10 cannot recognize that the device with which the HFP connection is established is different from the device with which the BLE connection is established, and hence it becomes impossible to perform data communication between the control apparatus 20 and the robot 10 and perform normal operations.

Figure 5:
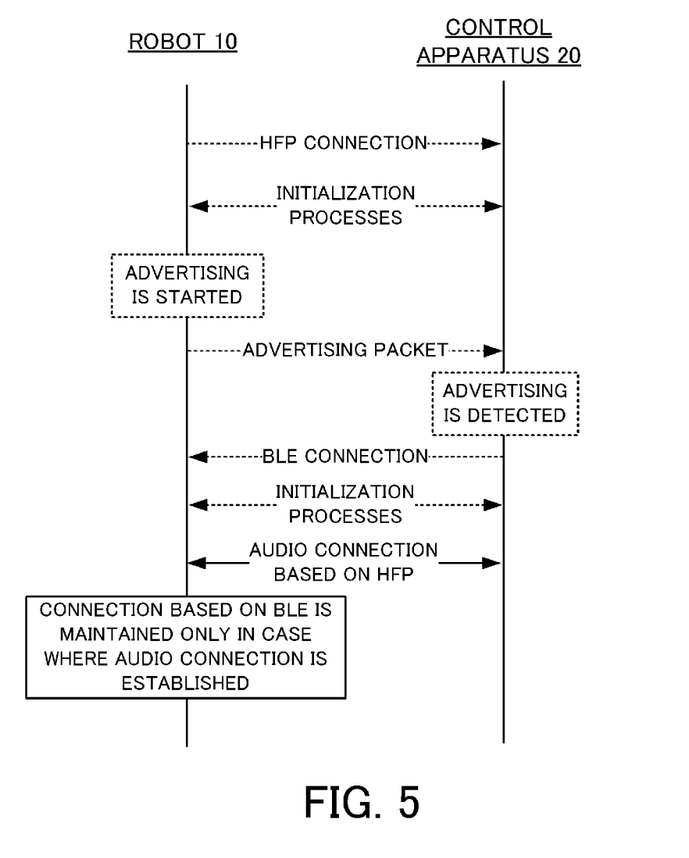
FIG. 5 is a diagram for explaining a connection procedure in the embodiment.

To cope with this, in the present embodiment, the processes shown in FIG. 3 are changed, as shown in FIG. 5. The changes are as follows. Note that a dotted line in FIG. 5 indicates that the process is the same as that shown in FIG. 3.

(1) The control apparatus 20 starts the audio connection based on HFP after the completion of the connection based on BLE.

In common methods, the audio connection is performed simultaneously with the connection based on HFP but, in the present embodiment, the audio connection is performed after the completion of the connection based on BLE.

(2) After the completion of the connection based on BLE, the robot 10 monitors the presence or absence of the audio connection based on HFP, and maintains the connection based on BLE only in the case where the audio connection is completed within a predetermined time period.

That is, in the case where the audio connection is not completed within the predetermined time period, the BLE connection is terminated.

Thus, in the case where the BLE connection with a device serving as a communication partner is established and the audio connection is not established even when the predetermined time period has elapsed, the robot 10 according to the present embodiment determines that improper connection is performed, and terminates the connection with the device.

Another Bluetooth device other than the control apparatus 20 does not recognize that both of the connection based on BLE and the audio connection established via HFP are required, and hence, even when the Bluetooth device responds to the advertising packet and attempts to perform the connection, the connection is canceled in a short time. That is, it becomes possible to reject the connection from the apparatus other than the apparatus that attempts to perform the connection with a proper procedure, and accept only the request from the proper apparatus.

(Voice Interaction Process)

Figure 6:
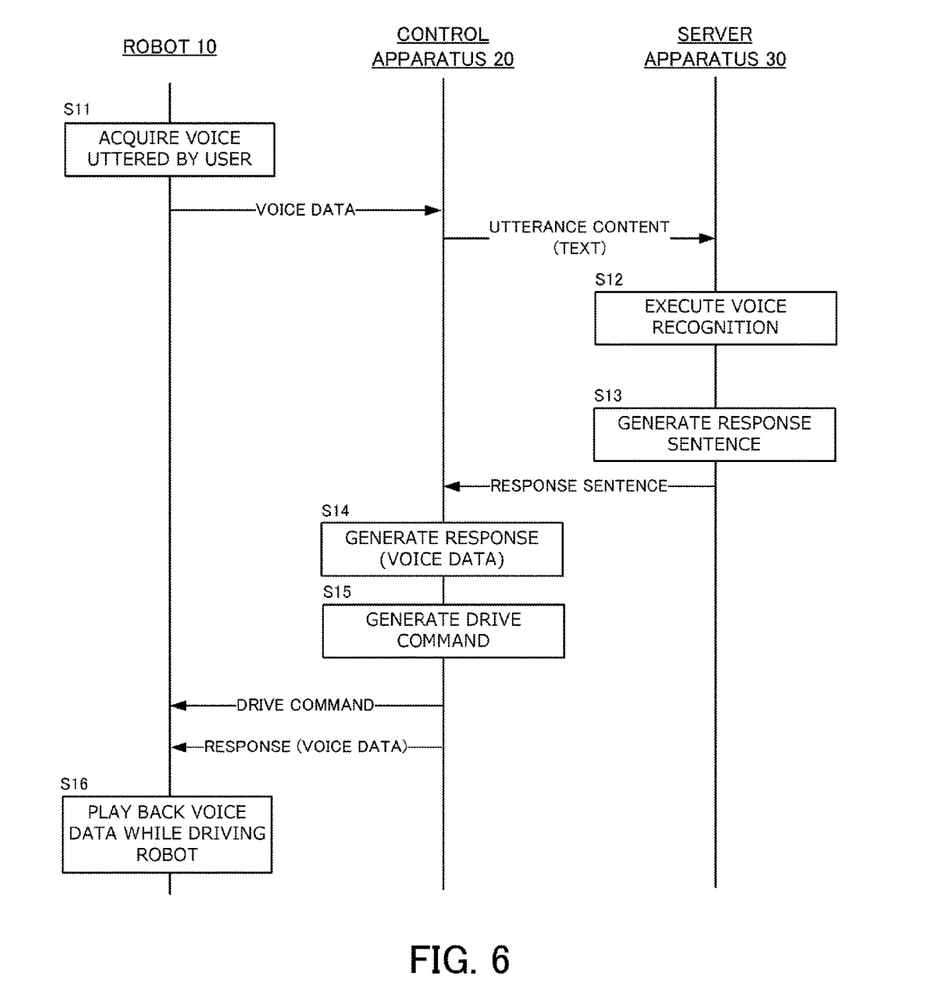
FIG. 6 is a diagram of a data flow among the robot 10, the control apparatus 20, and a server apparatus 30.

Next, a description will be given of a voice interaction process after the establishment of the connection with reference to FIG. 6 serving as a flowchart for explaining the details of the process and the flow of data.

First, in Step S11, the voice input section 11 of the robot 10 acquires the voice uttered by the user through the microphone. The acquired voice is converted to the voice data, and the voice data is transmitted to the control section 22 of the control apparatus 20 via the audio connection based on HFP. The control section 22 transmits the acquired voice data to the voice recognition section 32 of the server apparatus 30.

Next, the voice recognition section 32 performs the voice recognition on the acquired voice data, and converts the voice data to the text (Step S12). The text obtained as the result of the voice recognition is transmitted to the response generation section 33. Next, the response generation section 33 generates the response based on the content of the utterance obtained from the user (Step S13).

As described above, the response sentence may be generated by using the interaction dictionary (interaction scenario) of the server apparatus 30, and may also be generated by using an external information source (a database server or a web server). The generated response sentence is transmitted to the control apparatus 20, and is converted to the voice data by the control section 22 (Step S14).

In Step S15, the control section 22 generates the drive command based on the acquired response sentence. The voice data and the drive command are transmitted to the robot 10 at the same timing via the audio connection based on HFP and the connection based on BLE, and the playback of the voice data and the drive are performed simultaneously (Step S16).

As described thus far, the voice interaction system according to the present embodiment performs the transmission of the voice by using the connection based on HFP and, at the same time, performs the transmission of the drive command by using the connection based on BLE.

With this, it is possible to perform bidirectional voice transmission in real time and, by using BLE in data communication in which high communication speed is not required, it is possible to reduce power consumption.

In addition, in the case where the audio connection based on HFP is not established within the predetermined time period after the connection based on BLE is established, the connection based on BLE is terminated, and hence it is possible to eliminate unnecessary connection from other equipment that uses BLE.

Note that the drive command is transmitted by using BLE in the present embodiment, but a profile for data transmission may also be used. For example, it is possible to use Serial Port Profile (SPP). In addition, instead of HFP, Head Set Profile (HSP) may also be used.

(Modification)

The above-described embodiment is only exemplary, and the present invention can be appropriately modified and implemented without departing from the gist thereof.

For example, the server apparatus 30 performs the voice recognition in the description of the embodiment, but the control apparatus 20 may include a unit configured to perform the voice recognition. In addition, the server apparatus 30 performs the generation of the response sentence in the description of the embodiment, but the control apparatus 20 may perform the generation of the response sentence. Further, the control apparatus 20 generates the drive command based on the response sentence in the description of the embodiment, but the server apparatus 30 may generate the drive command.

Additionally, each of the short-range communication sections 12 and 21 performs both of the connection based on HFP and the connection based on BLE in the description of the embodiment, but the hardware may also be provided for each profile.

What is claimed is:

1. A voice input/output apparatus used for voice interaction with a user, comprising:
   a voice input unit configured to acquire a voice uttered by the user;
   a connection control unit configured to control connection between the voice input/output apparatus and a control apparatus that generates a response to the voice; and
   an interaction control unit configured to transmit the acquired voice to the control apparatus, receive the response to the voice from the control apparatus, and output the response to the voice, wherein
   the connection control unit establishes, between the voice input/output apparatus and the control apparatus, connection of a voice channel over which the voice is transmitted and connection of a data channel over which data other than the voice is transmitted, and terminates the data channel in a case where the connection of the voice channel is not completed within a predetermined time period from the establishment of the connection of the data channel.

2. The voice input/output apparatus according to claim 1, wherein
   each of the voice channel and the data channel is connected based on a Bluetooth standard, and the voice channel is connected by using a voice profile.

3. The voice input/output apparatus according to claim 2, wherein
   the data channel is connected based on a Bluetooth Low Energy (BLE) standard.

4. The voice input/output apparatus according to claim 3, wherein
   the connection of the voice channel involves two types of connection including the connection based on the voice profile and audio connection established via the voice profile, and
   the connection control unit accepts the audio connection from the control apparatus after completion of both of the connection based on the voice profile and the connection based on the BLE, and terminates the connection based on the BLE in a case where the audio connection is not completed within a predetermined time period from the establishment of the connection based on the BLE.

5. The voice input/output apparatus according to claim 2, wherein
   the voice profile is Hands-Free Profile (HFP).

6. A wireless connection method performed on a control apparatus by a voice input/output apparatus that acquires a voice uttered by a user and outputs, by voice, a response to the voice that is generated by the control apparatus,
   the wireless connection method comprising:
   establishing, between the voice input/output apparatus and the control apparatus, connection of a voice channel over which the voice is transmitted and connection of a data channel over which data other than the voice is transmitted in a case where a request is issued from the control apparatus; and
   terminating the data channel in a case where the connection of the voice channel is not completed within a predetermined time period from the establishment of the connection of the data channel.

7. A voice interaction system comprising:
   an audio interface apparatus; and
   a control apparatus, wherein
   the audio interface apparatus includes a first control unit configured to acquire a voice uttered by a user, transmit the voice to the control apparatus, receive a response to the voice from the control apparatus, and output the response to the voice,
   the control apparatus includes a second control unit configured to generate the response based on the voice received from the audio interface apparatus, and transmit the response to the audio interface apparatus,
   the audio interface apparatus and the control apparatus are connected to each other by a voice channel over which the voice is transmitted and a data channel over which data other than the voice is transmitted, and
   the audio interface apparatus terminates the data channel in a case where the connection of the voice channel is not completed within a predetermined time period from the establishment of the connection of the data channel.

8. The voice interaction system according to claim 7, wherein
   each of the voice channel and the data channel is connected based on a Bluetooth standard, and the voice channel is connected by using a voice profile.

9. The voice interaction system according to claim 8, wherein
   the data channel is connected based on a Bluetooth Low Energy (BLE) standard.

10. The voice interaction system according to claim 9, wherein the connection of the voice channel involves two types of connection including the connection based on the voice profile and audio connection established via the voice profile, the control apparatus starts the audio connection after completion of both of the connection based on the voice profile and the connection based on the BLE, and the audio interface apparatus terminates the connection based on the BLE in a case where the audio connection is not completed within a predetermined time period from the establishment of the connection based on the BLE.

11. The voice interaction system according to claim 8, wherein the voice profile is Hands-Free Profile (HFP).

* * * * *